US012573016B2

(12) United States Patent　　(10) Patent No.:　US 12,573,016 B2
Wakatsuki　　(45) Date of Patent:　Mar. 10, 2026

(54) METHODS AND NON-TRANSITORY COMPUTER READABLE STORAGE MEDIUM FOR IMAGE ANNOTATION QUALITY ASSURANCE

(71) Applicant: WOVEN BY TOYOTA, INC., Tokyo (JP)

(72) Inventor: Akira Wakatsuki, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 383 days.

(21) Appl. No.: 18/128,773

(22) Filed: Mar. 30, 2023

(65) Prior Publication Data

US 2024/0331120 A1　　Oct. 3, 2024

(51) Int. Cl.
*G06T 7/00*　　(2017.01)
(52) U.S. Cl.
CPC .. *G06T 7/0002* (2013.01); *G06T 2207/20081* (2013.01); *G06T 2207/30168* (2013.01)
(58) Field of Classification Search
CPC ......... G06T 7/0002; G06T 2207/20081; G06T 2207/30168
USPC ........................................................ 382/112
See application file for complete search history.

(56) References Cited

U.S. PATENT DOCUMENTS

| | | |
|---|---|---|
| 2019/0311641 A1 | 10/2019 | Plant et al. |
| 2020/0327319 A1 | 10/2020 | An et al. |
| 2022/0027854 A1 | 1/2022 | Yang |

FOREIGN PATENT DOCUMENTS

| | | | |
|---|---|---|---|
| CN | 108197658 A | 6/2018 | |
| EP | 4092565 A1 * | 11/2022 | ........... G06F 18/217 |

OTHER PUBLICATIONS

Esmaeili, Seyed A., Bharat Singh, and Larry S. Davis. "Fast-at: Fast automatic thumbnail generation using deep neural networks." Proceedings of the IEEE Conference on Computer Vision and Pattern Recognition. 2017. (Year: 2017).*

* cited by examiner

*Primary Examiner* — Jonathan S Lee
(74) *Attorney, Agent, or Firm* — Sughrue Mion, PLLC

(57)　　ABSTRACT

A method for inspecting image annotation quality in an annotated image dataset, the method including: obtaining an annotated image dataset; implementing a first inspection of X % of the annotated image dataset, the first inspection including at least one of first categories of annotation inspections; implementing a second inspection of a sample of the annotated image dataset, the second inspection including at least one of second categories of annotation inspections; and identifying errors in the annotated image dataset using the first inspection and the second inspection.

18 Claims, 4 Drawing Sheets

METHODS AND NON-TRANSITORY COMPUTER READABLE STORAGE MEDIUM FOR IMAGE ANNOTATION QUALITY ASSURANCE

TECHNICAL FIELD

Aspects of one or more example embodiments relate to providing a hybrid quality assurance process for annotated image datasets. The hybrid quality assurance process may include a quicker inspection of the annotated image datasets and may also include a more detailed inspection to better catch more critical errors as they may be more likely to have a significant impact on the machine learning training.

BACKGROUND

Artificial intelligence ("AI") is a rapidly developing technology which, among other things, utilizes the capability of computers to simulate intelligent behavior. Some AI-related processes may include, for example, speech recognition, computer vision, translation between (natural) languages, as well as other processes. Among such AI-related processes, computer vision processes, for example, may enable computers to derive meaningful information from digital images.

When implementing AI technology, it is important to assure the quality of the AI processes performed. One way to assure the quality of image-related AI processes for AI processes, is to use annotated image datasets to train computer vision AI models. Indeed, annotated image datasets are used for a wide variety of AI processes. For example, annotated image datasets may be used as training datasets for training computer vision AI models, or may be used as evaluation datasets for evaluating AI model performance, etc.

Annotated image datasets provided by image annotators (e.g., third party annotation vendors) may be subjected to an annotation quality assurance process prior to being released to an end user or customer. Such an annotation quality assurance process may be used for among other things, training or evaluating the user or customer's AI model. Further, such an annotation quality assurance process may, among other things, ascertain any differences between a customer's or end user's expectations and a vendor annotator's understanding. Moreover, such an annotation quality assurance process may, among other things, identify any annotation errors due to poor or sloppy annotations, human error, etc.

In detail, image annotation quality assurance may be conducted for at least two main purposes: (1) quality monitoring; and (2) quality improvement.

The term "quality monitoring" may refer to monitoring the quality of the annotation vendor's annotations to ensure that the annotation quality delivered from the particular vendor meets quality requirements set forth in a service level agreement ("SLA") and to ensure that the final deliverables of the annotation vendor meet the end user's or customer's quality targets that were agreed on in advance. Such quality monitoring may be performed periodically (e.g., on a weekly basis, etc.).

On the other hand, the term "quality improvement" may refer to improving the quality of the labels/annotations delivered to the end user/customer. For instance, if the quality assurance process (e.g., the quality monitoring mentioned above) identifies a surge or a trend of quality issues, then quality improvement activities may be implemented. Such quality improvement activities may include, for instance, providing feedback to annotation vendors, implementing countermeasures such as programmatic linter or modifying descriptions in instructions to annotation vendors, etc.

However, quality assurance processes typically consist only of a detailed review of a small sample size (e.g., 2-3%) of an annotated dataset provided by a vendor, as shown in FIG. 1. In detail, in operation 100, delivery of annotated dataset(s) is provided from a vendor. Then, in operation 101, a more detailed review/audit/inspection workflow is implemented. The more detailed review is a manual process performed by a human auditor to identify various categories of errors, including obvious errors (e.g., unlabeled objects, spam, basic rule incomprehension), label type mistakes (e.g., incorrect class labels), label positioning inaccuracies (e.g., improper annotation geometries such as bounding box tightness), and missing or incorrect label attributes. Finally, in operation 102, the annotated image datasets are released to a customer or end user after quality assurance processes have completed.

Related art annotation quality assurance processes typically inspect only a small sample size of an annotated image dataset due to the time and cost required for a more detailed inspection. As a result, related art annotation quality assurance processes may not catch annotation errors in the entirety of the dataset, including obvious annotation errors (e.g., spam annotations, unlabeled objects, mislabeling, etc.). These obvious annotation errors tend to be the more critical errors as they are more likely to have a severe impact on the AI machine learning training, model evaluation, etc. Therefore, a failure to catch these obvious annotation errors in the dataset has a disproportionate negative impact on the performance of the AI model and may contribute to a loss of trust from the end user/customer.

SUMMARY

According to one or more example embodiments, apparatuses and methods are provided for a hybrid quality assurance process for annotated image datasets. In particular, apparatuses and methods according to example embodiments incorporate both a quicker inspection workflow of an annotated image dataset, in addition to a more detailed inspection workflow of a sample (e.g., 2-3%, 10%, etc.) of the annotated image dataset.

According to an aspect of one or more example embodiments, a method includes: obtaining an annotated image dataset; implementing a first inspection of X % of the annotated image dataset, the first inspection including at least one of first categories of annotation inspections; implementing a second inspection of a sample of the annotated image dataset, the second inspection including at least one of second categories of annotation inspections; and identifying errors in the annotated image dataset using the first inspection and the second inspection.

According to an aspect of one or more example embodiments, a non-transitory computer readable storage medium stores instructions which, if executed, cause a computer to execute a method including: obtaining an annotated image dataset; implementing a first inspection of X % of the annotated image dataset, the first inspection including at least one of first categories of annotation inspections; implementing a second inspection of a sample of the annotated image dataset, the second inspection including at least one of second categories of annotation inspections; and identifying errors in the annotated image dataset using the first inspection and the second inspection.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The disclosure provides illustration and description, but is not intended to be exhaustive or to limit one or more example embodiments to the precise form disclosed. Modifications and variations are possible in light of the disclosure or may be acquired from practice of one or more example embodiments. Further, one or more features or components of one example embodiment may be incorporated into or combined with another example embodiment (or one or more features of another example embodiment). Additionally, in the flowcharts and descriptions of operations provided herein, it is understood that one or more operations may be omitted, one or more operations may be added, one or more operations may be performed simultaneously (at least in part), and the order of one or more operations may be switched.

It will be apparent that example embodiments of systems and/or methods and/or non-transitory computer readable storage mediums described herein may be implemented in different forms of hardware, firmware, or a combination of hardware and software. The actual specialized control hardware or software code used to implement these systems and/or methods is not limiting of one or more example embodiments. Thus, the operation and behavior of the systems and/or methods and/or non-transitory computer readable storage mediums are described herein without reference to specific software code. It is understood that software and hardware may be designed to implement the systems and/or methods based on the descriptions herein.

Even though particular combinations of features are recited in the claims and/or disclosed in the specification, these combinations are not intended to limit the disclosure of possible example embodiments. In fact, many of these features may be combined in ways not specifically recited in the claims and/or disclosed in the specification. Although each dependent claim listed below may directly depend on only one claim, the disclosure of possible example embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
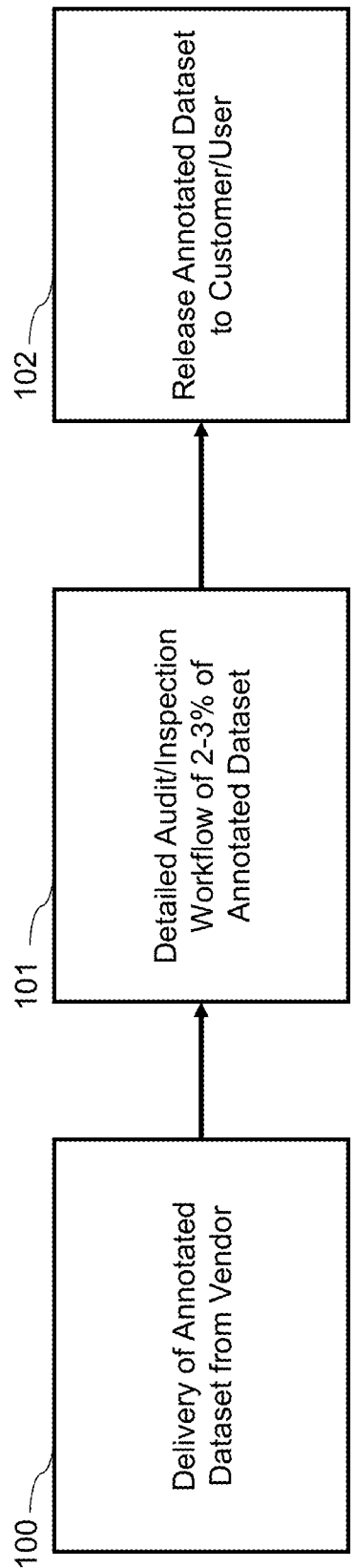
FIG. 1 is a flow diagram showing a related art annotation quality assurance process.
Figure 2:
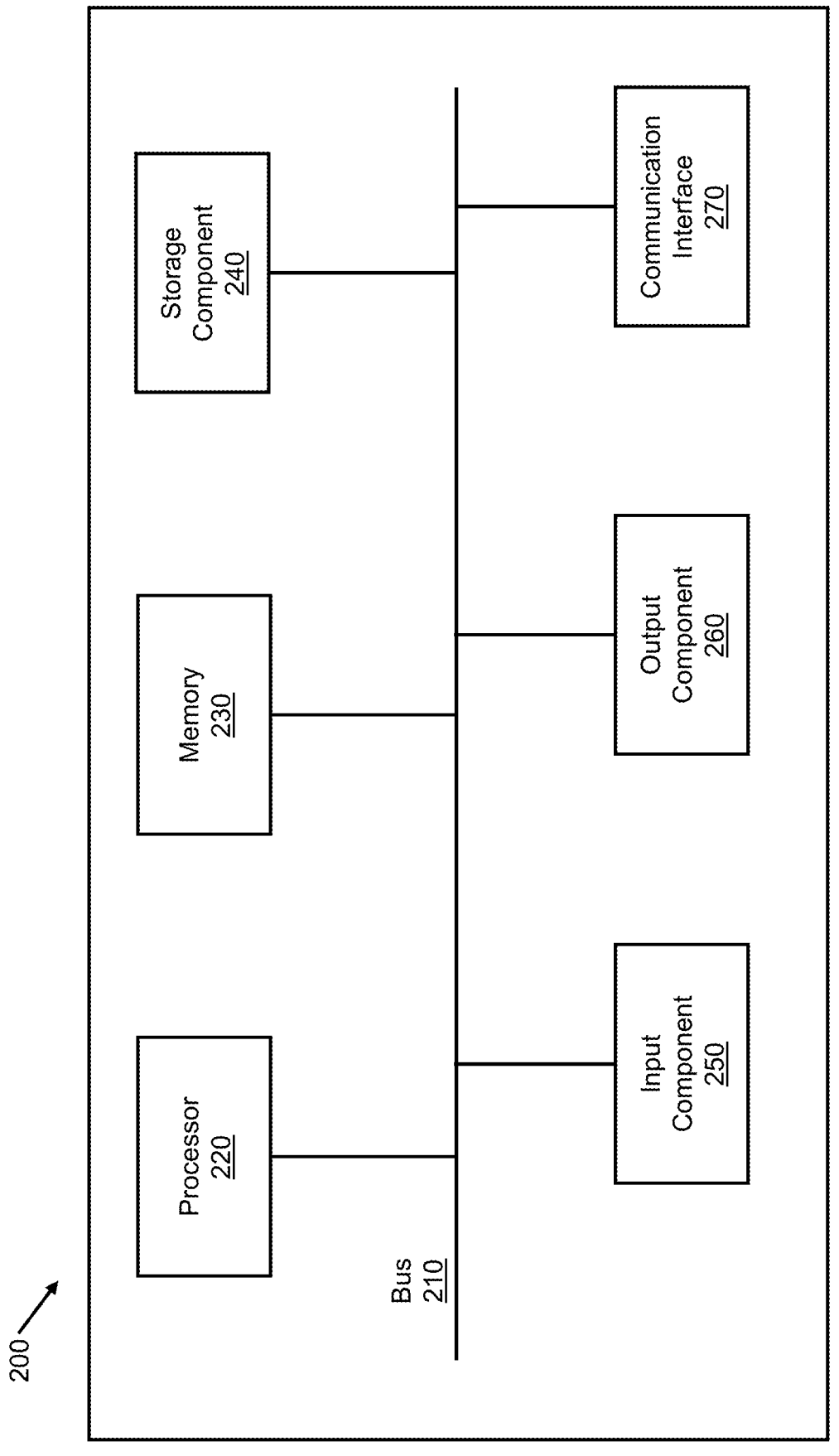
FIG. 2 is a diagram of example components of a device according to an example embodiment.

FIG. 2 is a diagram of example components of an image annotation quality inspection device 200. As shown in FIG. 2, image annotation quality inspection device 200 may include a bus 210, a processor 220, a memory 230, a storage component 240, an input component 250, an output component 260, and a communication interface 270.

Bus 210 includes a component that permits communication among the components of image annotation quality inspection device 200. The processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In one or more example embodiments, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

Storage component 240 stores information and/or software related to the operation and use of image annotation quality inspection device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits image annotation quality inspection device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from image annotation quality inspection device 200 (e.g., a display, a speaker, and/or one or more light-emitting diodes (LEDs)).

The communication interface 270 includes a transceiver-like component (e.g., a transceiver and/or a separate receiver and transmitter) that enables image annotation quality inspection device 200 to communicate with other devices, such as via a wired connection, a wireless connection, or a combination of wired and wireless connections. The communication interface 270 may permit the image annotation quality inspection device 200 to receive information from another device and/or provide information to another device. For example, the communication interface 270 may include, but is not limited to, an Ethernet interface, an optical interface, a coaxial interface, an infrared interface, a radio frequency (RF) interface, a universal serial bus (USB) interface, a Wi-Fi interface, a cellular network interface, or the like.

The image annotation quality inspection device 200 may perform one or more example processes described herein. According to one or more example embodiments, the image annotation quality inspection device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein.

Additionally, or alternatively, hardwired circuitry may be used in place of, or in combination with, software instructions to perform one or more processes described herein. Thus, one or more example embodiments described herein are not limited to any specific combination of hardware circuitry and software.

The number and arrangement of components shown in FIG. 2 are provided as an example. In practice, the image annotation quality inspection device 200 may include additional components, fewer components, different components, or differently arranged components than those shown in FIG. 2. Additionally, or alternatively, a set of components (e.g., one or more components) of the image annotation quality inspection device 200 may perform one or more functions described as being performed by another set of components of the image annotation quality inspection device 200.

One or more example embodiments provide a hybrid quality assurance process for annotated image datasets. In particular, one or more example embodiments may incorporate both a quicker inspection workflow of an annotated image dataset, in addition to a more detailed inspection workflow of a sample (e.g., 2-3%, 10%, etc.) of the annotated image dataset.

According to one or more example embodiments, an entirety (100%) of the annotated image dataset may be input to the quicker inspection workflow. The quicker inspection workflow may provide an inspection for obvious or critical errors (e.g., at least one of unlabeled objects, spam annotations, basic rule incomprehension, label type mistakes, etc.), as shown according to one or more example embodiments shown in FIG. 3.

Figure 3:
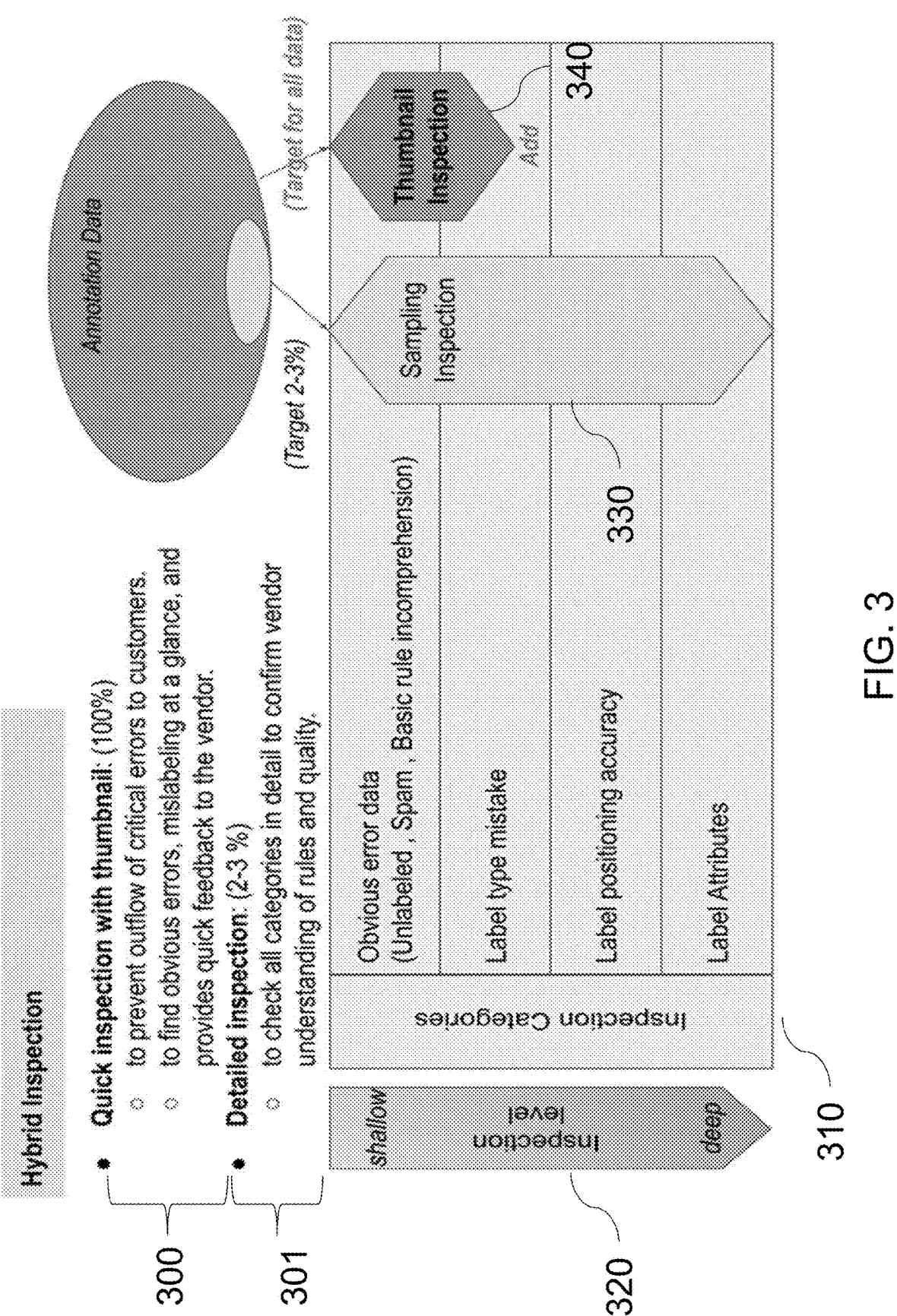
FIG. 3 is a diagram showing a hybrid annotation quality assurance process according to one or more example embodiments.

FIG. 3 is a diagram showing a hybrid annotation quality assurance process according to one or more example embodiments. As shown in FIG. 3, a hybrid annotation quality assurance process may comprise a hybrid inspection process comprising both a quicker inspection 300 and a more detailed inspection 301.

As one non-limiting example, the quicker inspection 300 may be performed with respect to thumbnails (or downsized/downscaled versions) of the annotated images in the dataset to facilitate time-efficient, cost-efficient (e.g., cost of auditor), and processing-efficient (e.g., processing cost/hardware load of computing device for inspection) inspection. The quicker inspection 300 may be configured to, among other things, reduce, or even prevent, the outflow of critical errors to customers. The quicker inspection 300 may be configured to find obvious errors, including, but not limited to, mislabeling at a glance, etc. Moreover, the quicker inspection 300 may provide quicker feedback to the annotation vendor.

On the other hand, a more detailed inspection 301 may be configured to, among other things, check all inspection categories in detail to confirm a vendor's understanding of rules and quality expectations. As shown in table 310, such inspection categories may include, but are not limited to: Obvious Error Data (e.g., unlabeled objects, spam, basic rule incomprehension, etc.); Label Type Mistake; Label Positioning Accuracy; and Label Attributes listed from top to bottom in order of deepening inspection level.

As shown by the arrow 320, according to one or more example embodiments, the inspection level of the hybrid annotation quality assurance processes may vary from a shallow inspection level to a deep inspection level. For instance, as shown in FIG. 3, the sampling inspection operation 330 may overlap with all of the aforementioned inspection categories. Further, as shown in FIG. 3, the sampling inspection operation 330 may performed using a subset of the annotation data in a target range of 2%-3%. However, one or more example embodiments are not limited to this specific target range.

Compared to the sampling inspection operation 330, the thumbnail inspection operation 340 is provided nearer to the shallow end of the inspection level spectrum and may target all of the annotation data.

According to one or more example embodiments, the thumbnail inspection operation 340 may comprise a first inspection and the sampling inspection operation 330 may comprise a second inspection.

Figure 4:
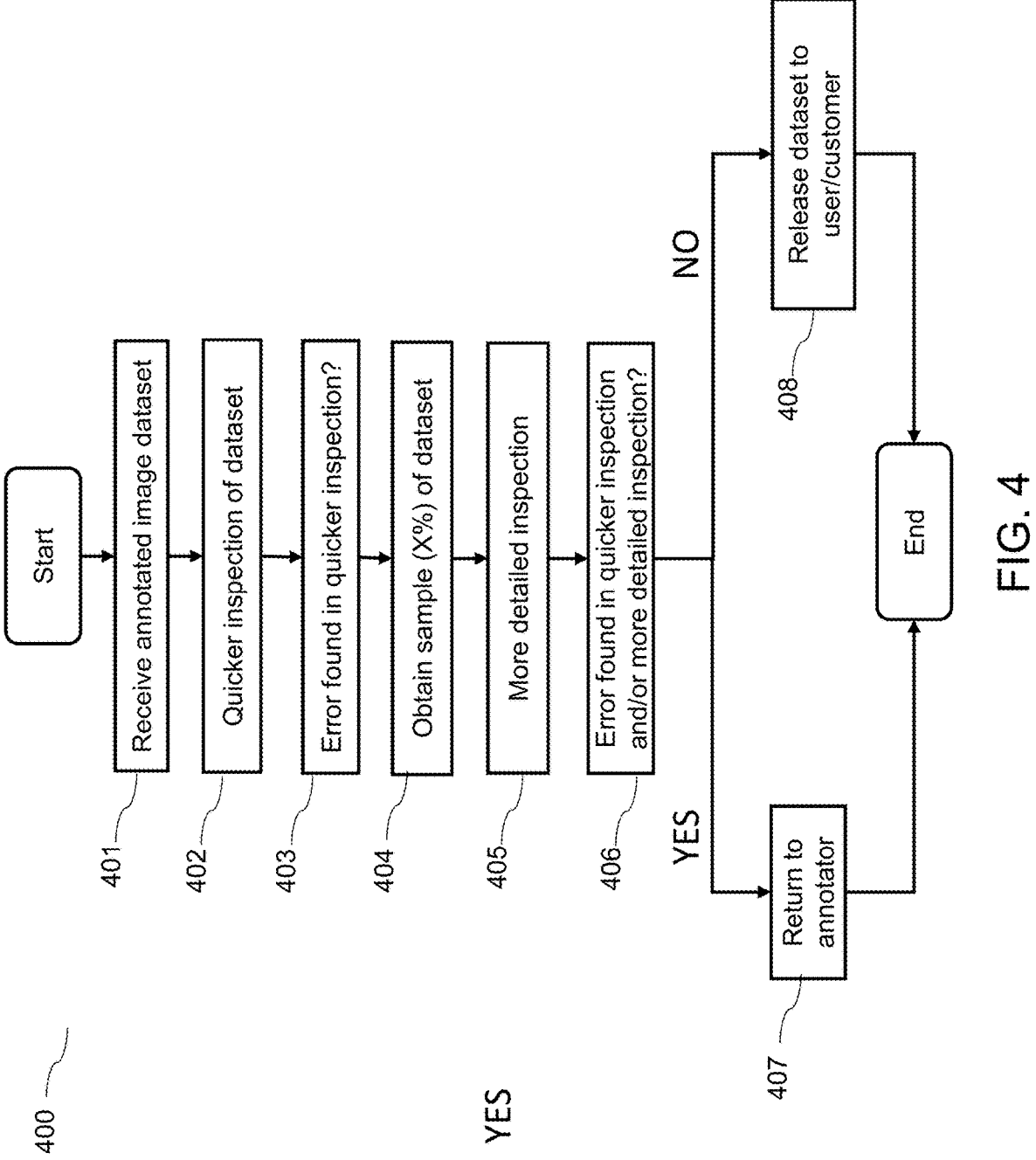
FIG. 4 is a flowchart showing a hybrid annotated image quality assurance process according to one or more example embodiments.

FIG. 4 shows a flowchart of a hybrid annotated image quality assurance process 400 according to one or more example embodiments. In accordance with an example embodiment, an auditing tool may include logic to respectively facilitate and/or implement each of the operations described below, to generate and output interfaces for each of the operations, to determine image frames to be ingested in each of the operations or workflows, to receive user inputs and process identifications of errors, etc.

Referring to FIG. 4, at operation 401, an annotated image dataset is received. For example, the annotated image dataset may be received from an annotator or annotation vendor. The annotated image dataset may be received or input to an auditing tool or an image/annotation inspection tool (e.g., software) implemented as computer-readable instructions executed by at least one processor.

At operation 402, the annotated image dataset is input to or ingested by a quicker inspection workflow. In this regard, 100% of the annotated image dataset may be input to the quicker inspection workflow. For example, the auditing tool according to one or more example embodiments may generate and/or output thumbnails of the image frames in the dataset for inspection by an auditor. The thumbnails may be output in an M×N view (e.g., 4×4, 8×8, etc.), where the number of rows and columns and/or the sizes of the thumbnails may be configured by a user (auditor), however, one or more example embodiments are not limited to this configuration.

At operation 403, it may be determined whether any of the images in the dataset contain an error that has been identified by the quicker inspection. According to one or more example embodiments, if an error is found in an image of the dataset in operation 403, then operation 404 may be performed and that image may be input to the more detailed inspection to identify any additional errors and/or to assign error details. Alternatively, error details may be added or assigned by the auditor in the quicker inspection workflow.

Further, at operation 404, a sample (e.g., 2%, 3%, 10%, predetermined/preconfigured percentage, etc.) of the annotated image dataset may be obtained for a detailed inspection. In this regard, the sample may be randomly obtained (e.g., by the auditing tool) from the dataset and/or may be obtained in accordance with one or more predefined rules (e.g., frames with one or more predetermined and/or predefined objects (e.g., rare objects such as motorcycles) are selected).

At operation 405, the obtained sample may be ingested by, or input to, a more detailed inspection workflow. The more detailed inspection workflow may include all of the inspection categories of the quicker inspection as well as additional inspection categories including, but not limited to, deeper inspection categories, as described above with reference to FIG. 3. The more detailed inspection may be with respect to full resolution image frames (or image frames with a higher resolution or size than that of the quicker inspection). In accordance with an example embodiment, the auditing tool may include logic to output an interface for the more detailed inspection, and output image frames with a higher resolution.

At operation 406 it is determined whether any error(s) have been identified in the quicker inspection Both the quicker and the more detailed inspections may be performed by auditors (i.e., manually). By way of example, the auditing tool may sequentially output each annotated image frame of the sample on a display for inspection by a user and for assignment or notation of errors by the user (auditor). The more detailed inspection may contribute to both quality monitoring and quality improvement. Further, based on the errors identified by the user during the more detailed inspection, quality metrics may be calculated (e.g., by the auditing tool). Also, quality issues found during more detailed inspection may be grouped according to their causes, and prioritized based on severity, number of cases in total and/or occurrence trend (e.g., by the auditing tool).

Countermeasures (such as programmatic linter or modifying descriptions in instructions to vendors, etc.) may be considered for higher priority issues and implemented. Once countermeasures are implemented, the trend of the particular issue occurrence may be monitored in order to determine or ensure that the countermeasure is effective. Additionally, major annotation issues or trends may be determined (e.g., by the auditing tool in accordance with one or more predefined rules, thresholds, etc.) and therefore identified for improvement/countermeasures/feedback.

As described above, quality metrics may be calculated or obtained based on errors identified in the more detailed inspection. To this end, the quality metrics may include a ratio of errors (or images with errors) to total number of image frames subject to the more detailed inspection. Moreover, as described above, if an error is found in an image of the dataset during the quicker inspection, that image may be input to the more detailed inspection to identify any additional errors and/or to assign error details. In this case, the image input from the quicker inspection may not be factored into the quality metric calculation, so as not to skew the overall metric (e.g., the ratio) calculated from the more detailed inspection.

According to one or more embodiments, image frames in which an error is detected in the quicker inspection and/or image frames in which an error is detected in the more detailed inspection may be returned and/or reported to the annotator (vendor) (e.g., with a redo task or request) in operation 407.

Referring back to FIG. 4, in operation 408, the inspected dataset may be released or confirmed for release to an end user (e.g., customer). Here, the dataset may only be released if no errors are found during the quicker inspection and/or if no errors are found during the more detailed inspection. Alternatively, only image frames for which no errors are found may be released.

It is understood that one or more operations of FIG. 4 may be omitted and/or one or more additional or alternate operations may be included, as described above in one or more example embodiments. Further, it is understood that the order of operations in FIG. 4 may vary. For example, it is understood that operation 402 may occur prior to, subsequent to, simultaneous with, overlapping with, etc., operation 404 and/or operation 405.

According to one or more example embodiments, by incorporating a quicker inspection of 100% of the dataset for obvious errors, outflow of these critical errors to end users/ customers may be reduced and/or prevented, and the dataset may be more accurate, resulting in a more accurate training/ evaluation/performance of an AI model. One or more example embodiments may improve the technology of AI machine learning training. One or more example embodiments may improve computer functionality by better catching more critical errors as they may be more likely to have a significant impact on the machine learning training. Thus, one or more example embodiments may improve computer capabilities in terms of AI machine learning training.

The foregoing disclosure provides illustration and description, but is not intended to be exhaustive or to limit one or more example embodiments to the precise form disclosed. Modifications and variations are possible in light of the disclosure or may be acquired from practice of one or more example embodiments.

One or more example embodiments may relate to a system, a method, and/or a computer readable medium at any possible technical detail level of integration. Further, one or more of the components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more example embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible example embodiments of systems, methods, and computer readable media according to one or more example embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the drawings. In one or more alternative example embodiments, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of one or more example embodiments. Thus, the operation and behavior of the systems and/or methods were described herein without reference to specific software code—it being understood that software and hardware may be designed to implement the systems and/or methods based on the description herein.

What is claimed is:

1. A method comprising, by at least one processor:
obtaining an annotated image dataset;
implementing a first inspection of X % of the annotated image dataset, the first inspection including at least one of first categories of annotation inspections, wherein the implementing the first inspection comprises outputting, by a display, thumbnail images of the X % of the annotated image dataset for inspection;
implementing a second inspection of a sample of the annotated image dataset, the second inspection including at least one of second categories of annotation inspections; and
identifying an error in the annotated image dataset using the first inspection and the second inspection.

2. The method according to claim 1, wherein the first inspection comprises an inspection of 100% of the annotated image dataset, and
wherein the sample is less than 100% of the annotated image dataset.

3. The method according to claim 1, wherein the at least one of second categories comprises the at least one of first categories in addition to at least one additional category of annotation inspections.

4. The method according to claim 3, wherein the at least one of first categories comprises at least one of: an inspection for unlabeled objects, an inspection for spam annotations, and an inspection for label type mistakes.

5. The method according to claim 3, wherein the at least one of second categories comprises at least one of: an inspection for unlabeled objects, an inspection for spam annotations, an inspection for label type mistakes, an inspection for label positioning accuracy, and an inspection of label attributes.

6. The method according to claim 1, further comprising, based on the error being identified, by the first inspection, in an annotated image, inputting the annotated image to the second inspection.

7. The method according to claim 1, wherein the method further comprises at least one of:

randomly selecting the sample from the annotated image dataset; and determining the sample by determining whether an image in the annotated image dataset includes a predetermined object.

8. A non-transitory computer readable storage medium storing instructions which, if executed, cause a computer to execute a method comprising:

obtaining an annotated image dataset;

implementing a first inspection of X % of the annotated image dataset, the first inspection including at least one of first categories of annotation inspections, wherein the implementing the first inspection comprises outputting, by a display, thumbnail images of the X % of the annotated image dataset for inspection;

implementing a second inspection of a sample of the annotated image dataset, the second inspection including at least one of second categories of annotation inspections; and identifying an error in the annotated image dataset using the first inspection and the second inspection.

9. The non-transitory computer readable storage medium according to claim 8, wherein the first inspection is an inspection of 100% of the annotated image dataset, and wherein the sample is less than 100% of the annotated image dataset.

10. The non-transitory computer readable storage medium according to claim 8, wherein the at least one of second categories comprises the at least one of first categories in addition to at least one additional category of annotation inspections.

11. The non-transitory computer readable storage medium according to claim 10, wherein the at least one of first categories comprises at least one of: an inspection for unlabeled objects, an inspection for spam annotations, and an inspection for label type mistakes.

12. The non-transitory computer readable storage medium according to claim 10, wherein the at least one of second categories comprises at least one of: an inspection for unlabeled objects, an inspection for spam annotations, an inspection for label type mistakes, an inspection for label positioning accuracy, and an inspection of label attributes.

13. The non-transitory computer readable storage medium according to claim 8, wherein the method further comprises, based on the error being identified, by the first inspection, in an annotated image, inputting the annotated image to the second inspection.

14. The non-transitory computer readable storage medium according to claim 8, wherein the method further comprises at least one of:

randomly selecting the sample from the annotated image dataset; and determining the sample by determining whether an image in the annotated image dataset includes a predetermined object.

15. The method according to claim 1, further comprising training a computer vision artificial intelligence model using the identified error.

16. The method according to claim 1, further comprising evaluating a computer vision artificial intelligence model using the identified error.

17. The non-transitory computer readable storage medium according to claim 8, wherein the method further comprises training a computer vision artificial intelligence model using the identified error.

18. The non-transitory computer readable storage medium according to claim 8, wherein the method further comprises evaluating a computer vision artificial intelligence model using the identified error.

* * * * *